United States Patent

Dann

[15] 3,663,743

[45] May 16, 1972

[54] FREQUENCY DIVIDING APPARATUS

[72] Inventor: Bert H. Dann, Mountain View, Calif.

[73] Assignee: Bell & Howell Company, Chicago, Ill.

[22] Filed: July 21, 1970

[21] Appl. No.: 56,788

[52] U.S. Cl...................178/5.4 CD, 178/5.4 SY, 307/225 R, 328/39, 328/155

[51] Int. Cl...........................................................H04n 9/44

[58] Field of Search.....................178/5.4 CD, 5.4 R, 5.4 SY; 307/225 R; 328/39, 155

[56] References Cited

UNITED STATES PATENTS 3,349,333 10/1967 Becker et al............................328/155

*Primary Examiner*—Robert L. Griffin
*Assistant Examiner*—George G. Stellar
*Attorney*—Luc P. Benoit

[57] ABSTRACT

A frequency divider provides an output signal which has a frequency that is divided relative to the frequency of an input signal and that displays a phase jump in response to a discontinuity in the input signal. This phase jump is sensed and a control signal is provided in response thereto. The frequency divider is constructed to adjust the phase of the output signal in response to the latter control signal so as to correct the above mentioned phase jump.

7 Claims, 1 Drawing Figure

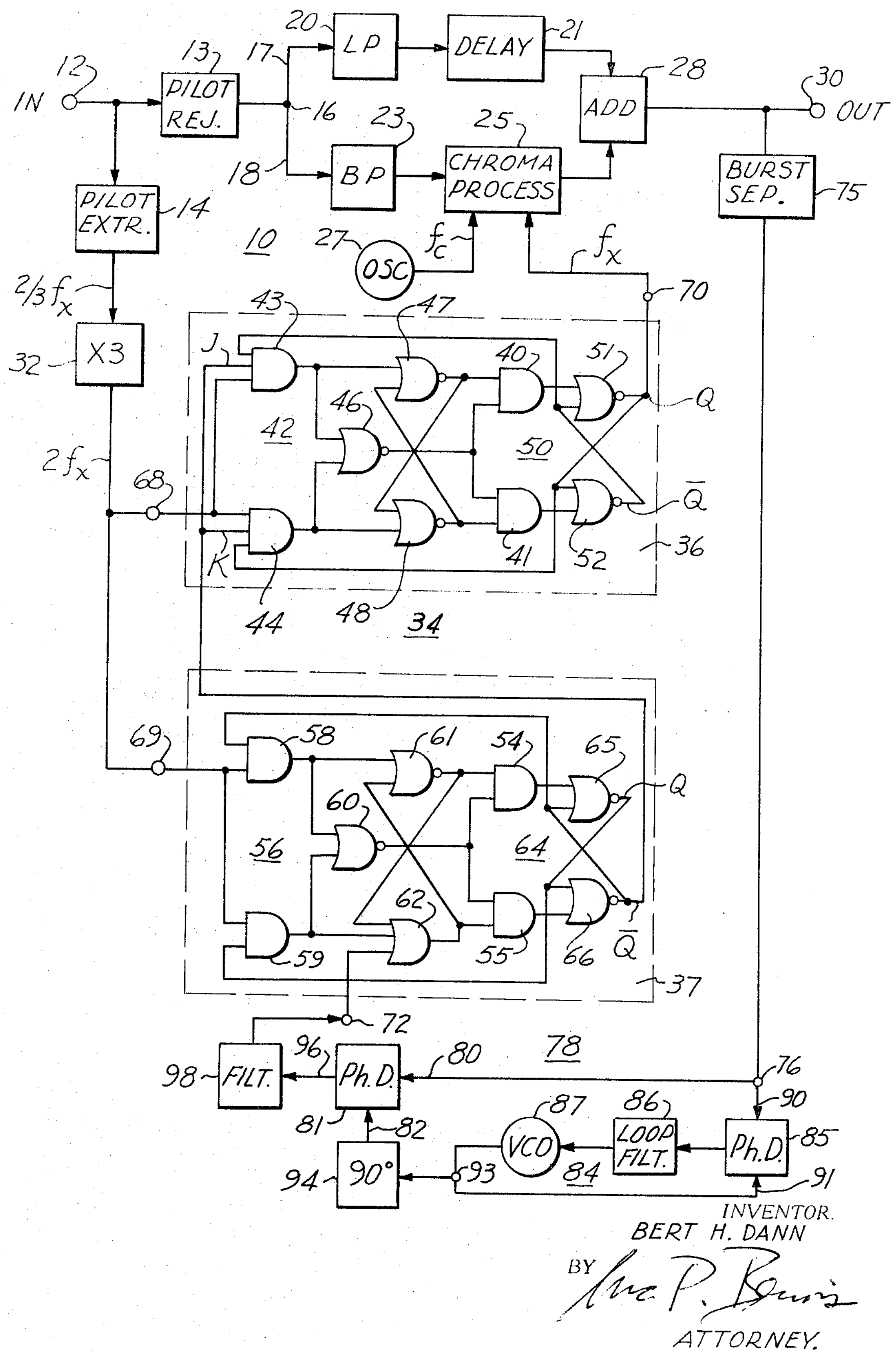
INVENTOR.
BERT H. DANN
BY
ATTORNEY.

FREQUENCY DIVIDING APPARATUS

CROSS-REFERENCE TO RELATED APPLICATION

Subject matter of the present application is related to subject matter of the following copending application the disclosure of which is herewith incorporated by reference herein:

U.S. Pat. application Ser. No. 56,787, "Signal Correcting Apparatus," filed July 21, 1970, by Bert H. Dann, and assigned to the subject assignee.

BACKGROUND OF THE INVENTION

1. Field of the Invention

The subject invention relates to signal processing apparatus and, more particularly, to apparatus for dividing the frequency of a signal.

2. Description of the Prior Art

Known frequency dividing circuits have an inherent phase ambiguity in their output signal. If a discontinuity occurs in the input signal of the frequency divider circuit, the inherent phase ambiguity manifests itself in a jump in the phase of the output signal. While this phase jump is tolerable in some applications, it can have drastic effects in many others.

By way of example, and not by way of limitation, it is known that these phase jumps can adversely affect the retrieval of phase-modulated signals. This may, for instance, be seen from a consideration of the retrieval of chrominance information from a color video signal.

In a color video signal chrominance information is contained in components which are amplitude and phase-modulated relative to a supressed color subcarrier and which include synchronizing signal known as color bursts. A burst-lock system in the color video receiver responds to these bursts and provides a local reference signal which serves the demodulation of the composite color video signal.

Special problems arise if the color video signal is recorded and is subsequently played back. By way of example, if the color video signal is recorded on magnetic tape and is thereupon played back for a display of the color video information, factors such as flutter and wow in the recording and playback processes, tape shrinking and elongation, and head-to-tape spacing irregularities produce angular variations in the reproduced color video signal which lead to hue aberrations to which the eye is particular sensitive, and which may prevent proper operation of chroma recovery circuits in the receiving set.

In an effort to counter these detrimental effects, the use of a pilot signal has been proposed. Typically, the pilot signal is recorded on tape, and is played back from such tape together with the color video signal. In this manner the pilot signal experiences practically the same angular errors as the color video signal and can thus be used as a means for correcting effects of angular errors in the color video signal.

In the playback of pilot signals it is often necessary that the frequency of the pilot signal be translated by apparatus which include a frequency divider. Discontinuities in the reproduced pilot signal which may be due to the playback head crossing the gap between recording tracks in a slant-track magnetic recorder or to other factors, lead to a phase jump in the pilot signal after frequency division thereof.

These pilot signal phase jumps lead to corresponding jumps in the phase of the processed chrominance signals and color synchronization bursts which impair the video display and particularly the operation of the burst-lock system of the color video receiver, since the latter will need time to recover to the new color subcarrier phase before proper reproduction of colors can again be provided.

It is a principal object of the subject invention to provide frequency dividing apparatus which are substantially free of the above mentioned disadvantages, and to provide color video processing apparatus in which the latter drawback is substantially overcome.

SUMMARY OF THE INVENTION

From a first aspect thereof, the invention resides in apparatus for dividing the frequency of a first signal which is subject to discontinuities, comprising in combination first means for receiving said first signal, second means connected to said first means for providing a second signal having a frequency which is divided relative to the frequency of first said signal, said second means tending to provide a phase jump in said second signal in response to a discontinuity in said first signal, third means operatively associated with said second means for sensing a provision of said phase jump said third means including fourth means for providing a third signal varying within a predetermined period of time in response to a provision of said phase jump, fifth means for providing a fourth signal remaining substantially stable within said predetermined period of time, and sixth means connected to said fourth and fifth means for sensing a provision of said phase jump by a comparison of said third signal with said fourth signal, and seventh means connected between said second and third means for correcting said phase jump in said second signal, in response to a sensing of said provision of said phase jump by said third means.

From another aspect thereof, the invention resides in apparatus for correcting effects of angular errors in a color video signal including a color synchronization signal and being accompanied by a pilot signal which is subject to discontinuities, comprising in combination first means for receiving said pilot signal, second means for receiving said color video signal including said color synchronization signal, third means connected to said first means for at least dividing the frequency of said pilot signal, said third means tending to provide a phase jump in said frequency-divided pilot signal in response to said discontinuities, fourth means for providing a substantially stable carrier signal, fifth means connected to said second, third and fourth means for redisposing modulation components of said color video signal including said color synchronization signal about said substantially stable carrier signal whereby to correct effects of angular errors in said color video signal, with said phase jump in said frequency-divided pilot signal causing a phase shift in said redisposed color synchronization signal, sixth means connected to said fifth means for sensing said phase shift in said redisposed color synchronization signal, and seventh means connected between said third and sixth means for correcting said phase jump in said frequency-divided pilot signal in response to a sensing of said phase shift in said redisposed color synchronization signal.

BRIEF DESCRIPTION OF THE DRAWINGS

The invention will become more readily apparent from the following detailed description of a preferred embodiment thereof, illustrated by way of example in the accompanying drawing in which the single FIGURE is a diagrammatic illustration of color video signal processing and frequency dividing apparatus in accordance with a preferred embodiment of the subject invention.

DESCRIPTION OF THE PREFERRED EMBODIMENT

The illustrated color signal processing apparatus 10 includes a systems input 12 to which a composite color video signal accompanied by a pilot signal is applied. By way of example and not by way of limitation it is assumed that the composite video signal has been played back from a magnetic recording tape and that the pilot signal has been recorded on and played back from the tape together with the composite color video signal.

The composite color video signal received at input 12 includes luminance information and chrominance information. The chrominance information includes color signal modulation components disposed about a suppressed color subcarrier which, in the NTSC system, nominally oscillates at approximately 3.58 MHz. The color signal includes color bursts which serve a local reproduction of the color subcarrier preparatory to a demodulation of the modulated color signal.

Angular errors in the color video signal interfere with the proper retrieval of the color information. As mentioned above, angular errors may be due to such factors as flutter and wow in the recording and playback processes, recording tape shrinking and elongation, and head-to-tape spacing irregularities. While the frequency of the pilot signal is not subject to any absolute limitation, many error-correcting apparatus operate best if the pilot signal that participates in the correction process has a frequency that corresponds to the frequency of the color subcarrier.

However, difficulties would occur if the pilot signal frequency corresponded to the color subcarrier frequency when the pilot signal is recorded and subsequently played back together with the color video signal. These difficulties would be due to the fact that it is virtually impossible to retrieve a pilot signal of such a frequency from the played-back signal without eliminating material portions of the chrominance information and synchronization signals.

As has been disclosed in the above mentioned copending patent application, the most favorable frequencies for the recorded pilot signal include submultiples, such as two-thirds, three-fourths, or four-fifths, of the color subcarrier frequency. To restore such a pilot signal to a frequency corresponding to the color subcarrier frequency, it is generally necessary to subject the played-back pilot signal to a frequency multiplication and frequency division during which phase jumps of the above mentioned type tend to occur.

By way of example it is assumed that the pilot signal which is employed in the illustrated system for color-correction purposes have a frequency of $f_x$ which, except for phase variations representing angular errors, is equal to the color subcarrier frequency. It is also assumed by way of example that the pilot signal frequency is equal to $⅔ f_x$ when the pilot signal is recorded and played back together with the composite color video signal.

Accordingly, the played-back signal received at the systems input 12 includes a pilot signal having a frequency of $⅔ f_x$ which is rejected from the composite color video signal by a conventional pilot rejection filter 13, and which is extracted from the composite color video signal by a conventional pilot extraction filter 14 connected to the input 12.

The composite color video signal sans pilot signal is applied to a point 16. A luminance branch 17 and a chrominance branch 18 are connected to the point 16. The luminance branch 17 includes a low-pass filter 20 which extracts luminance information from the composite video signal. The luminance branch 17 also includes time delay means 21 designed to compensate for delays imposed in the chrominance branch 18.

The chrominance branch 18 includes a bandpass filter 23 for extracting chrominance information from the played-back composite video signal. Chroma processing apparatus 25 connected to the bandpass filter 23 redispose modulation components of the color video signal including color synchronization signals or color bursts about a substantially stable carrier signal so as to correct effects of angular errors in the color video signal.

To name an example, the processing apparatus 25 may include equipment of the type disclosed in U.S. Pat. No. 3,095,472, "Video Recording System and Method," by R. M. Dolby et al., issued June 25, 1963. Briefly, these approaches include means for decoding the chroma signal into their I and Q or (R − Y) and (B − Y) components by means of a reference signal $f_x$, and for remodulating such latter components about a substantially stable color subcarrier $f_c$ provided by a local oscillator 27.

To name another example, the processing apparatus 25 may include a heterodyning system of the type disclosed in U.S. Pat. No. 2,979,558, "Recording and Reproducing System" by E.M. Leyton, issued Apr. 11, 1961.

If desired, the processing apparatus 25 may include one of the advanced processing systems disclosed in the following patent applications, which are assigned to the subject assignee, and the disclosures of which are herewith incorporated by reference herein: Ser. No. 872,847, "Signal Correcting Apparatus," filed Oct. 31, 1969, by Bert H. Dann; Ser. No. 872,848, "Signal Correcting Apparatus," filed Oct. 31, 1969, by Bert H. Dann; Ser. No. 873,284, "Signal Correcting Apparatus," filed Nov. 3, 1969, by Bert H. Dann; and Ser. No. 873,416, "Signal Correcting Apparatus," filed Nov. 3, 1969, by Bert H. Dann and Floyd M. Gardner.

An adding network or amplifier 28 recombines the luminance signal derived from the delay means 21 and the processed chrominance components to provide a composite video signal which is applied to a systems output 30. This composite color video signal, in which effects of angular errors on the chrominance information are corrected, may be utilized in a conventional manner, such as by application to color television receiver circuits for a display of the color video program.

To provide the requisite reference signal of a frequency of $f_x$, the played-back and extracted pilot signal of a frequency of $⅔ f_x$ is subjected to a frequency multiplication and division.

More specifically, the extracted pilot signal is applied to a conventional frequency multiplier 32 which multiplies the frequency of the extracted pilot signal by a factor of three. Accordingly, the frequency multiplier 32 provides an output signal of frequency of $2f_x$. The latter $2f_x$ signal is applied to a frequency divider 34 which divides the frequency of such signal by a factor of two so as to provide the requisite $f_x$ reference signal for the chroma processing equipment 25.

The frequency divider 34 includes a pair of J-K Binary Flip-Flop elements 36 and 37. Both of these elements include logical AND elements and logical NOR elements. Each AND element has an output of binary 1 if an input signal of binary 1 is applied to each of its inputs. Each NOR element has an output of a binary 1 if an input signal of a binary 0 is applied to each of its inputs. The construction and operation of AND and NOR elements is well known in the art of logic circuit design, as is the fact that a binary 0 may be represented by a relatively low voltage level, while a binary 1 may be represented by a relatively high voltage level.

The J-K Flip-Flop element 36 includes a pair of AND elements 40 and 41 which connect a master flip-flop 42 including AND elements 43 and 44 and NOR elements 46, 47 and 48 to a slave flip-flop 50, including NOR elements 51 and 52.

The J-K Flip-Flop element 37 includes a pair of AND elements 54 and 55 which connect a master flip-flop 56 which includes a pair of AND elements 58 and 59 and NOR elements 60, 61 and 62 to a slave flip-flop 64 which includes a pair of NOR elements 65 and 66. The interconnections between the various components of the flip-flop elements 36 and 37 are conventional and are illustrated in the drawing.

The $2f_x$ output of the frequency multiplier 32 is applied to the inputs 68 and 69 of the flip-flop elements 36 and 37, respectively. At this juncture we may assume that the flip-flop element 37 initially has a high voltage level at its Q output. Accordingly, if a half wave appears at the input 69, the AND element 59 provides a high voltage level to the NOR elements 60 and 62. This, in turn, provides a low voltage level at one of the inputs of each of the AND elements 54 and 55, which disconnects the slave flip-flop 64 from the master flip-flop 56. The application of the high voltage level by the AND element 59 to the NOR element 62 produces a voltage level at the output of the NOR element 62 which is applied to one of the inputs of the NOR element 61. This, in turn, causes the occurrence of a high voltage level at the output of the NOR element 61. This high voltage level is applied to one of the inputs of the AND element 54 and to one of the inputs of the NOR element 62.

Application of the high voltage level just mentioned to the NOR element 62 retains that NOR element in its low output voltage condition. On the other hand, application of this high voltage level to the AND element 54 causes this AND element to supply a high voltage level to the NOR element 65 when the second input of the AND element 54 is provided with a high voltage level from the NOR element 60 as either input of that NOR element attains a low voltage level when the instantaneous value of the half wave that is applied to the input 69 approaches its zero crossover.

The high voltage level which the AND element 54 applies to the NOR element 65 causes the Q output of the flip-flop 37 to decrease to a low voltage level which, because of the illustrated interconnections of the NOR elements 65 and 66, causes the $\overline{Q}$ output of the NOR element 66 to rise to a high voltage level. This high voltage level is applied to the J and K inputs of the flip-flop element 36. At this juncture we may assume that a high voltage level exists at the Q output of the flip-flop element 36.

Accordingly, the AND element 44 produces a high voltage level during the next half wave that is applied to the inputs 68 and 69. This high voltage level causes the NOR element 46 to apply a low voltage level to the AND elements 40 and 41, which disconnects the slave flip-flop 50 from the master flip-flop 42. The high voltage level provided by the AND element 44 also causes the NOR element 48 to apply a low voltage level to the AND element 41 and to the NOR element 47. Accordingly, the NOR element 47 provides a high voltage level to the AND element 40, whereupon the AND element 40 provides a high voltage level to the NOR element 51 as the NOR element 46 again applies a high voltage level to the AND element 40 and 41 when the half wave applied to the input 68 and 69 approaches the zero crossover point.

In consequence, the Q output of the flip-flop element 36 reaches a low voltage level which is applied to the NOR element 52 whereupon the $\overline{Q}$ output of the flip-flop 36 reaches a high voltage level. In terms of frequency division this means that the half wave under consideration produces a binary zero output signal at the output 70 of the flip-flop combination 36 and 37.

Since the $\overline{Q}$ output of the flip-flop element 37 carries a high voltage level during the half wave under consideration, the AND element 58 provides a high voltage level upon the occurrence of this half wave at the input terminal 69. This high voltage level again causes the NOR element 60 to disconnect the slave flip-flop 64 from the master flip-flop 56 through the AND element 54 and 55. The high voltage level provided by the AND element 58 also causes the output of the NOR element 61 to acquire a low voltage level which is applied to the NOR element 62. In the absence of a high voltage level at the control input 72 of the flip-flop element 62, the low voltage level applied by the NOR element 61 to the NOR element 62 causes the NOR element 62 to apply a high voltage level to the AND element 55. Accordingly, when the NOR element 60 again applies a high voltage level to the AND element 55 upon the half wave applied at 69 approaching zero crossover, the AND element 55 applies a high voltage level to the NOR element 66 which, in turn, causes a low voltage level to appear at the $\overline{Q}$ output of the flip-flop element 37, so that the application of a high voltage level to the J and K inputs of the flip-flop element 36 ceases.

In terms of frequency division this means that the next half wave applied to the input 68 does not produce a binary 1 output at the output terminal 70 of the flip-flop combination 36 and 37. However, such half wave, in view of its application to the input terminal 69, causes the high voltage level to be switched from the Q output to the $\overline{Q}$ output of the flip-flop element 37, whereby the flip-flop element 36 is set to respond to the next half wave applied to the input 68. This next half wave causes the AND element 43 to apply a high voltage level to the NOR elements 46 and 47 which causes the AND elements 40 and 41 to disconnect the slave flip-flop 50 from the master flip-flop 42, and which causes the NOR element 47 to permit the NOR element 48 to apply a high voltage level to the AND element 41. As the half wave under discussion approaches its zero crossover, the NOR element 46 energizes the second input of the AND element 41 whereupon that AND element applies a high voltage level to the NOR element 52 which causes the $\overline{Q}$ output of the flip-flop element 36 to recede to a low voltage level. This recession, in turn, permits the NOR element 51 to apply a high voltage level to the Q output of the flip-flop element 36 and thus to the output 70 of the flip-flop combination 36 and 37.

It will now be recognized that the flip-flop combination 36 and 37 divides the frequency of the $2f_x$ pilot signal by a factor of two so as to provide a pilot signal of the frequency $f_x$ for the chroma processing equipment 25. As is the case with other frequency dividers, the frequency divider 34 tends to produce a phase jump in the $f_x$ output signal when a discontinuity occurs in the $2f_x$ pilot signal. While the subject invention is not limited in its broad aspects to any particular field of application, it will be recognized that discontinuities in the input signal of the frequency divider are particularly prone to occur in the recording and playback of video signals with transverse-scan video tape recorders in which several recording and playback heads take turns in recording and in subsequently reproducing the video signal, or with slant-track video tape recorders in which one or two recording heads are caused to follow slanted tracks that are separated at the margins of the magnetic recording tape.

The occurrence of a phase jump in the $f_x$ signal is easily understood from the above description if one realizes that an interruption during the application of a half wave to the input 68 and 69 causes the NOR elements 46 and 60 in the flip-flop combination 36 and 37 to apply prematurely a high voltage level to the AND elements 40 and 41, and 54 and 53, respectively, whereby the prevailing binary condition of the master flip-flops 42 and 56 is prematurely imposed on the slave flip-flops 50 and 64, respectively.

A phase jump in the $f_x$ signal applied to the chroma processing apparatus 25 leads to corresponding phase shifts in the processed chrominance signals and color synchronization bursts at the systems output 30. This sudden phase shift in the color burst, for instance, interferes with the proper recovery of the color information from the composite video signal inasmuch as the burst-lock system in the video receiver will need time to recover to the new color subcarrier phase before proper reproduction of colors can again be provided.

The subject invention provides equipment which corrects a phase jump in the frequency divider output before it can substantially impair the operation of the system. It may be helpful to realize at this juncture that the apparatus herein disclosed do not necessarily maintain the *absolute* angular relationship of the input (i.e. pilot) and output (i.e. recovered reference) signal for each time that the playback equipment is turned on. Rather, the apparatus according to the subject invention maintain an established angular relationship between input and output signals over input signal discontinuities between longer "off" periods of the equipment. This fact does not limit the utility of the subject invention in color video and other systems which in their operation do not rely on a maintenance of the absolute angular relationship between a first signal (e.g. the pilot) and a second signal (e.g. the recovered reference).

In the illustrated embodiment the correction equipment under consideration operates in response to a sudden phase shift in the color synchronization burst of the processed color video signal. To this end a conventional burst separator 75 is connected to the output of the adding network 28 and operates to apply color bursts of the processed color video signal to an input 76 of the correction equipment 78. The burst separator 75 is designed in a conventional manner so that the signal applied through the input terminal 76 to a first input 80 of a phase detector 81 varies in a very short period of time in response to a sudden phase shift in the burst of the processed color video signal. The signal applied to the second input 82 of the phase detector 81, on the other hand, remains stable within the period of time just mentioned since the second input 82 is connected to the input terminal 76 by way of an electronic flywheel apparatus 84.

The electronic flywheel apparatus 84 includes a phase detector 85, a loop filter 86 and a voltage controlled oscillator 87. The phase detector 85 provides the loop filter 86 with a signal that is proportional to the phase difference between the signals applied to the phase detector inputs 90 and 91. The loop filter 86, in turn, applies the signal provided by the phase detector 85 to the voltage controlled oscillator 87 which provides at a terminal 93 a signal the phase of which corresponds to the amplitude of the signal applied by the loop filter 86. Since the terminal 93 is connected to the phase detector input 91, it follows that the phase detector 85 compares the phase of the signal received at the input terminal 76 with the phase of the signal provided by the voltage controlled oscillator 87. The voltage controlled oscillator 87 is designed in a conventional manner so that the loop included in the electronic flywheel apparatus 84 locks in at a phase of 90° of the signal applied at the phase detector input 91 relative to the signal applied at the phase detector input 90. In addition, the loop filter 86 is designed in a conventional manner to have a long time constant which does not permit the phase lock loop to respond at a rapid rate to phase shifts in the color bursts received at the terminal 76. By way of example, the loop filter 86 may have such a long time constant that the loop does not respond to phase shifts at the phase detector 85 within a period of time corresponding to the occurrence of three to four color bursts. In comparison to mechanical high-inertia devices, the phase lock-loop 84 is designated as an electronic flywheel.

The output signal of the electronic flywheel 84 is applied to the phase detector input 82 through a conventional phase-shift network 94 which accounts for the 90° phase locking operation of the phase lock loop. The phase detector 81 provides only a low voltage level at its output 96 as long as the input signals at the phase detector inputs 80 and 82 are in phase. If the phase of the signal received at the phase detector input 80 is suddenly shifted in response to a phase shift in the color bursts of the processed video signal, while the phase of the input signal received at the phase detector input 82 remains constant because of the flywheel effect of the phase-lock loop 84, the phase detector 81 provides a high voltage level at its output 96. This high voltage level is applied to the control signal input 72 of the flip-flop combination 36 and 37 through a filter 98 which has a sufficiently short time constant to permit a rapid correction of the phase jump in the $f_x$ pilot signal.

The effect of an application of a high voltage level to the control signal input 72 will be understood if it is considered that the application of a high voltage level to any of the inputs of the NOR element 62 will result in the provision of a low voltage level by that NOR element.

As mentioned above, the provision of a high voltage level by the AND element 58 causes the NOR element 61 to provide a low voltage level at the NOR element 62 which, in turn, causes the NOR element 62 to apply a high voltage level to the AND element 55 whereupon the output of the NOR element 66 will become low while the output of the NOR element 65 will become high. This provides a high voltage level at one of the inputs of the AND element 95 so that a high voltage level will appear at the $\overline{Q}$ output of the flip-flop element 37 during the next half cycle. On the other hand, if the NOR element 62 receives a high voltage level through the control signal input 72 while the output of the NOR element 61 is low, then the output voltage level of the NOR element 62 remains low, rather than being switched high in response to the low output of the NOR element 61. In consequence, both of the inputs of the NOR elements 61 and 62 remain low so that no switching between the Q and $\overline{Q}$ outputs of the flip-flop element 37 takes place during the particular half wave. Since such switching controls the operation of the flip-flop element 36 through the $\overline{Q}$ output of the flip-flop element 37 and the J and K inputs of the flip-flop element 36, and since such switching is postponed as just mentioned by one half wave, if follows that the occurrence of a high voltage level at the control signal input 72 shifts the phase of the $f_x$ pilot signal provided at the output 70 by one half wave which corresponds to a phase shift of 180°.

The latter 180° phase shift corresponds to the 180° phase jump provided by the frequency divider 34 in response to a discontinuity in the $2f_x$ pilot signal, so that such phase jump is effectively corrected. Based on the subject disclosure and on conventional principles of electronic circuit design, the subject invention can readily be expanded to frequency dividers of division ratios other than 1:2.

I claim:

1. Apparatus for dividing the frequency of a first signal which is subject to discontinuities, comprising in combination:
- first means for receiving said first signal;
- second means connected to said first means for providing a second signal having a frequency which is divided relative to the frequency of said first signal, said second means tending to provide a phase jump in said second signal in response to a discontinuity in said first signal;
- third means operatively associated with said second means for sensing a provision of said phase jump, said third means including fourth means for providing a third signal varying within a predetermined period of time in response to a provision of said phase jump, fifth means for providing a fourth signal remaining substantially stable within said predetermined period of time, and sixth means connected to said fourth and fifth means for sensing a provision of said phase jump by a comparison of said third signal with said fourth signal; and
- seventh means connected between said second and third means for correcting said phase jump in said second signal, in response to a sensing of said provision of said phase jump by said third means.

2. Apparatus as claimed in claim 1, wherein:
- said fifth means include a phase-lock loop having a time constant exceeding said predetermined period of time.

3. Apparatus as claimed in claim 1, wherein:
- said second means include means for adjusting the phase of said second signal in response to a control signal by an amount sufficient to correct said phase jump; and
- said fourth means include means for providing said control signal in response to said sensing by said third means, and for applying said control signal to said phase adjusting means.

4. Apparatus for correcting effects of angular errors in a color video signal including a color synchronization signal and being accompanied by a pilot signal which is subject to discontinuities, comprising in combination;
- first means for receiving said pilot signal;
- second means for receiving said color video signal including said color synchronization signal;
- third means connected to said first means for at least dividing the frequency of said pilot signal, said third means tending to provide a phase jump in said frequency-divided pilot signal in response to said discontinuities;
- fourth means for providing a substantially stable carrier signal;
- fifth means connected to said second, third and fourth means for redisposing modulation components of said color video signal including said color synchronization signal about said substantially stable carrier signal whereby to correct effects of angular errors in said color video signal, with said phase jump in said frequency-divided pilot signal causing a phase shift in said redisposed color synchronization signal;
- sixth means connected to said fifth means for sensing said phase shift in said redisposed color synchronization signal; and
- seventh means connected between said third and sixth means for correcting said phase jump in said frequency-divided pilot signal in response to a sensing of said phase shift in said redisposed color synchronization signal.

5. Apparatus as claimed in claim 4, wherein said sixth means include:
- eighth means for providing a first signal varying within a predetermined period of time in response to said phase shift in said redisposed color synchronization signal;

ninth means for providing a second signal remaining substantially stable within said predetermined period of time; and tenth means connected to said eight and ninth means for sensing said phase shift in said redisposed color synchronization signal by a comparison of said first and second signals.

6. Apparatus as claimed in claim 5, wherein:

said ninth means include a phase-lock loop having a time constant exceeding said predetermined period of time.

7. Apparatus as claimed in claim 4, wherein:

said third means include means for adjusting the phase of said frequency-divided pilot signal in response to a control signal by an amount sufficient to correct said phase jump; and said seventh means include means for providing said control signal in response to said sensing of said phase shift in said redisposed color synchronization signal, and for applying said control signal to said phase adjusting means.

* * * * *